Dec. 5, 1967 R. W. HAILEY 3,356,496
METHOD OF PRODUCING HIGH DENSITY METALLIC PRODUCTS
Filed Feb. 25, 1966 2 Sheets-Sheet 1
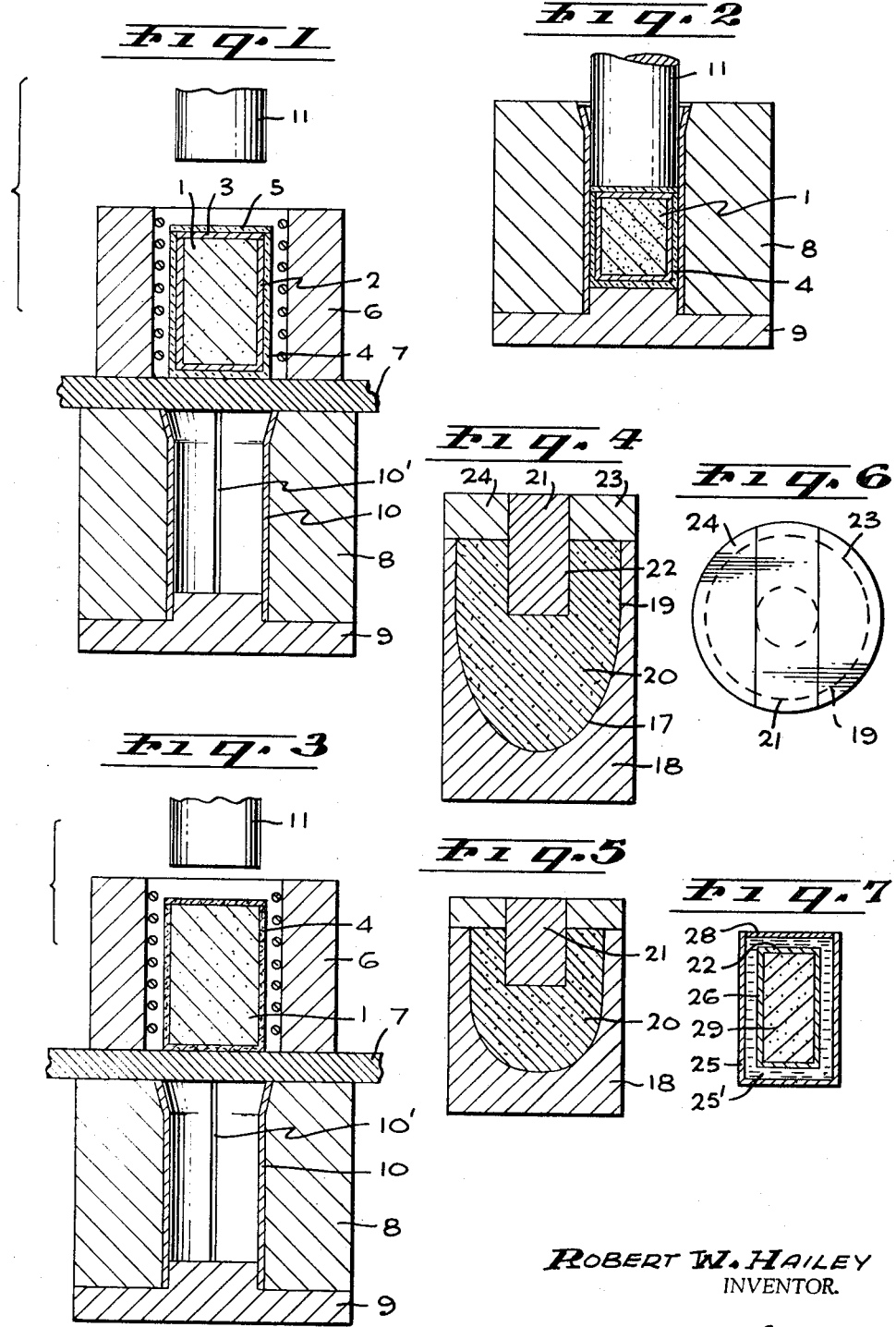
Robert W. Hailey
INVENTOR.
BY
ATTORNEY Dec. 5, 1967   R. W. HAILEY   3,356,496
METHOD OF PRODUCING HIGH DENSITY METALLIC PRODUCTS
Filed Feb. 25, 1966   2 Sheets-Sheet 2
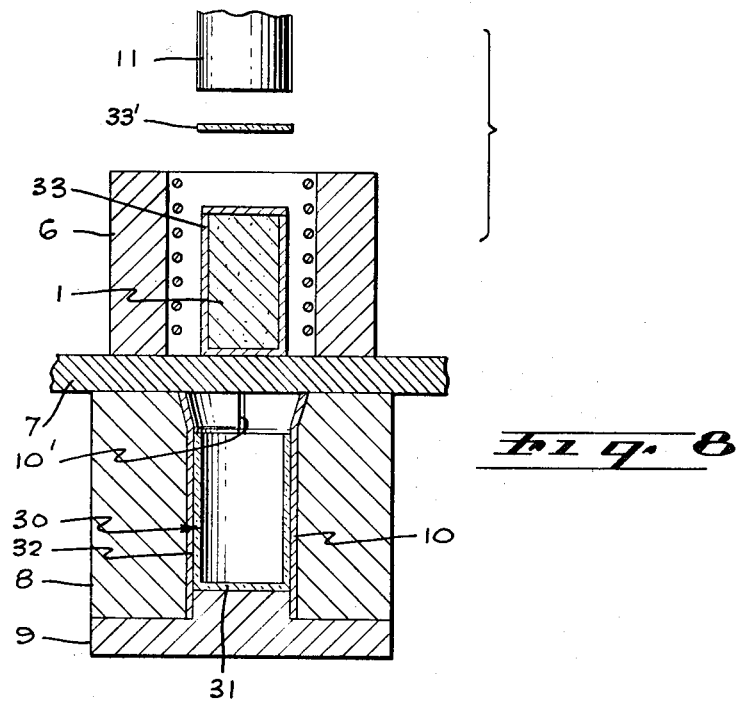
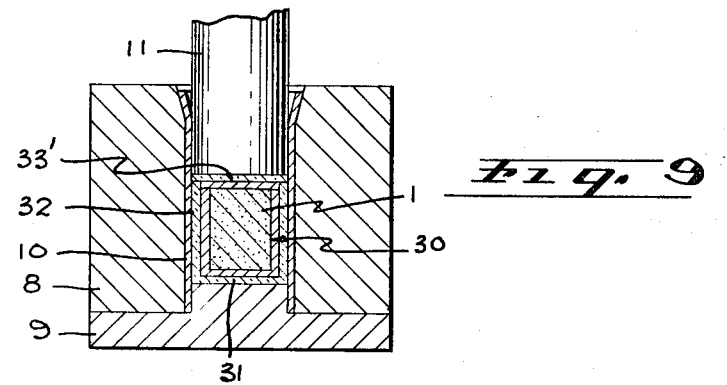
ROBERT W. HAILEY
INVENTOR.
BY *Philip Subkow*
ATTORNEY

United States Patent Office 3,356,496
Patented Dec. 5, 1967

3,356,496
METHOD OF PRODUCING HIGH DENSITY METALLIC PRODUCTS
Robert W. Hailey, 5455 Oleta Turn,
Long Beach, Calif. 90815
Filed Feb. 25, 1966, Ser. No. 536,524
14 Claims. (Cl. 75—226)

This application is a continuation-in-part of Ser. No. 335,468, now abandoned.

This invention relates to the consolidation of powdered materials to form dense parts which may be of shaped form, and has for its general object to provide improved procedures by which it becomes possible to convert the materials to various end products of superior qualities.

I have found that past procedures impose severe limitations on the consolidation of powdered materials, metals, and alloys which may be processed. Some of the limitations are the ability to achieve high, uniform densities, produce product forms of any appreciable size, consolidate composites of different materials, and compete economically with other production techniques. In addition, the refractory materials with high melting points normally require high consolidation temperatures and present special problems by past procedures with regard to tooling, contamination, and cost. Examples of these refractory materials are zirconium, tungsten, molybdenum, niobium, tantalum, hafnium, rhenium, and their alloys and compounds.

Where compressive forces are imposed on a body of the powdered metal or material, in the procedures of the prior art, problems arise from the non-uniformity of the compressive forces imposed across each cross-section of the powdered body, with a consequent variation in the density within the body of the formed part.

In the process of my invention, these and other problems arising from the compaction of powdered metals, metalloids and other elements, alloys thereof, metallic compounds, and metalloid compounds herein referred to as powdered material are successfully solved, and coherent bodies approaching the theoretical density of the element or compounds may be obtained.

It is an object of my invention to form, by compressive forces imposed on a body of powdered material, a coherent billet or shaped part of such material.

It is a further object of my invention, especially applicable to consolidation of powders which are not readily deformable at ordinary temperatures, to heat such a body of powdered material and subject such heated material to such compressive forces, and to limit the heat loss from the heated powdered material in the period between the heating stage and the forming stage. This permits the use of lower temperatures in the heating step, or alternatively, permits the compaction of materials requiring higher temperatures during forming.

Another object of my invention is to form the coherent body under a compressive force which is relatively uniformly applied throughout the body of material being compacted.

It is a further object of my invention to heat the powdered material and compact it in a heated container, so that during compaction there is interposed between the heated powdered material and the environment to which it may lose heat during the compaction process, a heat barrier in the form of a barrier wall having a low coefficient of heat conductivity.

It is a further object of my invention to pack the powdered material or place pressed or sintered material in a container which has a low coefficient of heat conductivity. The container and the formed product after compaction are separable, and after compaction is completed the container may be readily separated from the formed product.

These and other objects of my invention will be further described in connection with the following figures.

FIGS. 1-3 illustrate, in schematic form, processes of my invention;

FIGS. 4-7 illustrate modifications of the processes of my invention, and containers suitable for use therewith;

FIGS. 8 and 9 illustrate further modifications of my invention.

In FIG. 1, a metallic thin wall cylindrical container 2 is filled with powdered material. The material is packed into the metallic container as well as may be obtained by vibration or impact packing the container to fill the container to its top. Manual manipulation may be employed, but higher frequencies, including supersonic frequencies, for packing the powdered material may be used, by applying well known techniques for such purposes. When the powder has reached the top of the wall of the container, the thin wall metallic cover 3 is placed on the top of the wall of the container, and the covered metallic container is placed into a closely fitting cylindrical cup 4 of refractory material more fully described below, and herein sometimes referred to as refractory container. The top surface of the cover 3 is substantially co-planar with the top surface of the circumambient wall of the container 4. Refractory cover 5 is then placed on top of the circumambient wall of the container 4 and over the outer surface of the top 3 of the container 2. The metallic container, if sealed by making a relatively gas tight seal at the cover, should be sealed under vacuum so that the residual air content in the container volume in which the powdered material is contained, is reduced to a minimum. Such techniques for vacuum sealing of containers are well-known in the art. It is not necessary to seal the covers to the tops of the containers, except where the containers are evacuated or contain a gas or volatile material generated in the forming process which is desired to retain under pressure in the forming process.

The container 4 is introduced into the furnace shown schematically as 6. Any conventional form of furnace may be employed, such as a flame heated furnace or induction furnace. The purpose is to raise the temperature of the material 1 to a forming temperature whereby the powdered material may be compressed and particles formed into a solid coherent body of high density. The heated body is then introduced into the forming apparatus illustrated in FIG. 1 as a press.

In the schematic illustration of FIG. 1, the press cavity is formed by the base 9 and wall 8. A liner 10, which may be metallic, having a longitudinal slit 10' along the entire length of its cylindrical and bell mouth wall, is placed in the press cavity with a lubricant such as graphite grease or other conventional high temperature lubricant between the liner 10 and press cavity wall 8. The separator 7 is removed and the container 4 passes into the cylindrical press cavity. The furnace 6 is removed, and the plunger 11 moves down into the press cavity.

The plunger cross-section is made substantially equal to the cross-section of the container 4 (see FIG. 2). The plunger descends at a controlled rate, depending in part on the temperature employed. The plunger may be operated by a hammer or crank or toggle operated press, in which case the terminal pressure applied at the end of the stroke is relieved substantially immediately or the plunger may be hydraulically operated so that the terminal pressure may be maintained for a chosen period of time, here referred to as the hold time. In the case of the hydraulically operated plunger, the rate of pressure application i.e. rate of plunger descent may be controlled and varied. In the case of the crank or toggle press, this rate is controlled by the speed of the press. The applied force should be maintained sufficiently long during compaction and may be maintained at the end of the plunger stroke to assure the densification and coherence of the particles and to avoid substantial spring-back of the container or the material contained therein when the compressive force is relieved.

The container and the contained material take a "set" at the end of the process and are thus inelastically compressed and reduce in length with but minor increase in the dimension of the wall thickness of the outer and inner container and minor decrease in the dimension of the inner diameter of the container 2. The contained material and the material of container 4 are compacted and increased in density by proper choice of the temperature, duration and magnitude of applied force and the rate of force application. It is possible to reach theoretical solid densities; that is, the bulk density of the material of the container 4, and the contained material 1, may each approach the theoretical densities of these materials.

During the compaction, the metallic liner 10 is upset longitudinally, due to the frictional forces between the container and the liner, the liner moving freely in the press 8 without any substantial scoring of the press cavity. The length of time between the insertion of the heated container into the press and the completion of the forming operation is so short that the heat loss to and through the liner is sufficiently minimized to allow maintenance of a forming temperature.

Liner 10 may be made of metal as noted or of other materials which will act as a short duration heat barrier between the hot container and the lubricated die walls. Liner materials may include plastics such as the thermosetting plastics, or carbon or graphite, or paper or cardboard (in normal condition, or carbonized, or treated with a fire retardant chemical, or otherwise treated to enhance thermal insulation and frictional properties). The liners may also have a thin coating of ceramic material on their internal surfaces to provide increased thermal insulation and to prevent reaction of the liner with the container.

The base 9 may then be removed, and the plunger 11 descends to eject the container 4 through the bottom of the press. The liner 10 may then be removed and a new liner introduced, if the process is to be repeated. The use of a split liner facilitates the removal of the liner.

The outer refractory container may then be removed, either by breaking away or by cutting or grinding. In some cases, where the material 1 is compatible with the metal of the container 2, the metallic container 2 may be welded to the body of the formed material 1. If separation is necessary, the container 2 may be removed by any suitable machining or chemical procedures as are conventional for removing an outer layer of metal from a coherent body.

Instead of using a container which is composed of an inner metallic container and an outer refractory container, I may use only the refractory container 4, as is illustrated in FIG. 3, with like results. This has the advantage that the complexity introduced by the metallic container is avoided and the consolidated material is easily separated from the container.

In FIG. 3 the like parts are indicated by like numbers as are employed in FIG. 1. The procedure described in connection with FIG. 1 is employed in the process illustrated in FIG. 3.

The refractory container initially contains pores. The compaction of the refractory container by the press causes the longitudinal compaction of the container, increasing its bulk density, and causing a minor increase in the thickness of the container wall.

While I do not wish to be bound by any theory of my process, the results obtained are consistent with the view that the bridging between the particles of which the container is formed is broken down, and the particles are plastically deformed at the temperatures and pressures employed, to cause a substantially uniform distribution of the pressure in the composite body, composed of the container 4 or, if container 2 is used, of both containers, and also of the material 1. The resulting compressed container is reduced in height, is substantially integral, and is not fragmented, although cracks may sometimes appear.

The decrease in height and volume of the refractory container thus results in the considerable increase in the density of the container. When the metallic container is employed, as in FIG. 1, the inner metallic container is upset. It is shortened, and the wall thickness is somewhat increased.

This property of the refractory container makes possible the forming of shaped parts having simple or complex geometric configuration. The cavity of the refractory container may be made to any desired shape, and the cover may also be shaped to any desired shape.

For purposes of illustration and not as a limitation, FIG. 4 illustrates such a complex shape. Thus, the cavity of container 18 may have an ellipsoidal base 17 and the cylindrical wall 19. The refractory cross bar 21, carrying the depending refractory plug 22 formed integrally therewith, is placed on top of the wall 19 at the desired location, and the powdered material is introduced as previously described until the container cavity is filled to the top. The refractory cover segments 23 and 24 are placed over the top of the container as shown. The assembly is then heated and pressed as described in connection with FIG. 3.

The material and the container and cover are compressed longitudinally, and the container and powdered material are compressed into a shape of substantially smaller longitudinal dimensions axially of the system, with but a minor variation in dimensions perpendicular to the longitudinal axial dimension, as is schematically illustrated in FIG. 5.

Variations of the process can be used as described above to make almost any form of hollow or solid product. For instance, a pipe T might be prepressed in the form of two separate but mating halves, which can be fitted over a core made of ceramic material or of graphite or carbon coated with ceramic material. Split mold sections of container material can be fitted around the outside of the part to assure a proper and convenient fit of the part in the container. During compaction, the part halves will weld together to form a complete part from which the core is readily removable.

For some products, the procedures described above can be used to provide water cooling channels and heating coils integrated directly into the products during consolidation. For these types of products, the core materials may be made to the required shape, so that the powdered material for the products can be packed around the cores and prepressed into place before consolidation. Cores for water cooling channels would be designed to allow convenient removal by machining with a flexible tool or by using chemical solution procedures. Heating elements would be encased in electrically insulating core material which would consolidate partially during the compaction process, and be left in place with the heating elements.

Instead of using a refractory container having inherent strength and stability, as described above, to supply the heat barrier and pressure distribution, I may employ a non-coherent layer of silica or other refractory material (see FIG. 7). The process described in connection with FIGS. 1 to 6 may be employed using a double-walled container, one or both of which may be refractories described above, or one or both of which may be metallic. The space between the containers may be filled with particulate material which may be either refractory materials such as, for example, the material from which the refractory container 4 is formed, or any other particulate material, such as is more fully described below.

A layer of the particulate material 25' is placed in the cup 25 to the desired height. The container 26 is filled with powdered material 29, which is to be consolidated, and is covered by the cover 22, such as is described in connection with FIGS. 1–6. The covered container is then placed centrally of the cup 25, and the cup 25 is then filled with the particulate material and covered by cover 28, substantially similar to the procedures as described in connnection with FIGS. 1–6. The container is then processed as is described in connection with FIGS. 1–6.

The compaction of the container produces, as previously described, a solid coherent high density form of the powdered material 29, and longitudinal compaction of the particulate material 25'. Its height is reduced, and the loose powder 25' is compacted into a relatively solid, substantially coherent liner within the containers 25 and 26. The containers and the liner may be removed from the compacted body contained with the container 26.

Whereas in the forms of FIGS. 1–7, I heat the container having a wall of refractory material and introduce the container into the metallic liner, I may also obtain certain of the advantages of my process by employing a refractory material liner in the press cavity contiguous to, and inside the metallic liner. The refractory material liner and the metallic liner may be in position in the press cavity in the unheated state when the heated container is introduced into the press cavity. Alternatively, the refractory liner may be preheated prior to introduction. The plunger descends to compress the container and the refractory material liner.

FIGS. 8 and 9 illustrates this operation.

The press cavity 10 contains, for example, liner 10 and cup 30 of refractory material having a bottom 31 and a cylindrical wall 32 acting as an interior liner of refractory material. The container 33 may be either a metallic container such as container 2 without the container 4 of FIG. 1, or the composite container of FIG. 1 or FIG. 7 or the refractory container of FIGS. 2–6. The container 33 is heated as described above and is introduced into the press cavity. The furnace is removed and the cover 33' is placed over the top of the wall 32 and the top of the container 33. The press plunger whose diameter is equal to the exterior diameter of the circumambient wall 32, descends and compresses the liner 30 and the container 33 in the manner described above.

The liner 30 may be initially at a relatively low temperature, e.g., about atmospheric temperature, or at an elevated temperature. In both cases, it acts to effectively contain the heat in the container. Due to the fact that the refractory cup 30 is not at a high temperature during the early portions of the forming process under the compressive force induced by the plunger 11, the compaction of the refractory material liner as shown in FIG. 9 may involve more extensive destruction of its integrity than is the case where the refractory container is heated and compressed at a high temperature. However, in the process of FIGS. 8 and 9, since compaction of the refractory liner occurs, pressure is distributed on the contained produced material.

In the process of each of the figures, the refractory container and the liner interpose a heat barrier between the hot material particles inside the container and the wall of the press cavity. In addition to the thermal insulating effect of the container material, heat loss from the powdered material being consolidated is further reduced because of the low heat conductivity of the space or interface between the refractory material and the liner, and between the liner and the press cavity.

The metallic liner has the additional advantage of reducing the probability of scoring of the press cavity wall. The lubricated liner here acts to introduce a relatively free moving protective film between the press cavity wall and the refractory container.

Thus, the procedure of FIGS. 8 and 9 permits heating of the powdered material to very high temperatures, for example, 4000–6000° F., where the procedures of FIGS. 2 to 6 are employed. The heated container may then be processed by insertion into the refractory liner of FIG. 8 without injury to the press cavity, where such a procedure, when employed with the press of FIG. 2, would damage the press cavity, as for example, in tempering the metal.

The material to be consolidated, such as is shown at 1, 20 and 29 above, may be any one of the powdered metals and alloys thereof such as are used in conventional powder metallurgy. For example, they may be powders of iron, steel, aluminum, beryllium, nickel, cobalt, copper, zinc or tin, and alloys thereof, all of which are available as powders and have been employed in conventional powder metallurgy techniques. Silicon is available as crystals and may be ball-milled to the desired particle size for use in my process. The process of my invention may be employed for compaction of all such metals, metal alloys, as well as composites of metals and alloys.

The above metals are herein collectively referred to as soft powdered metals, or soft powdered materials in contradistinction to hard materials, since they are more ductile and require lower temperatures and terminal pressures and may be formed at higher forming rates than the hard materials.

Examples of hard materials include powders of tungsten, molybdenum, tantalum, rhenium, columbium, hafnium, and alloys thereof, herein referred to as the refractory metals, and the hard metallic compounds such as the borides, carbides and nitrides.

In this connection, the refractory metals must be distinguished from the refractory materials such as the refractory ceramics or graphite employed in forming the containers of FIG. 6 or the powders of the liner of FIG. 7, or the liner 30 of FIGS. 8 and 9, which are usually non-metallic.

The consolidation of non-metallic powders, such as the metalloids and non-metallic elements solid at ordinary temperatures and compounds such as the carbides, silicides, oxides, sulfides, nitrides and borides which are solid at ordinary temperature conditions under the conditions of the temperature and pressure employed, may also be accomplished by the process of my invention described above. For example, I may compact crystalline uranium oxide powder. Tungsten carbide powder, alone or in admixture with a small amount of cementing metallic cobalt or nickel binder in the powdered form, may be employed. The sulfides, selenides and tellurides of the second subgroup of the periodic table, to wit: zinc, cadmium and mercury, may be compacted. These materials are photoconductive or luminescent and are of interest since, by making the container, for example, container 4 of FIGS. 1 to 3, of suitably small height, these materials may be compressed into wafers of desired coherency and photoactivity.

The wide range of materials that can be consolidated by the process makes it possible to combine compatible metals, alloys and ceramics in virtually any composition without the problems found in melting and casting or in standard powder metallurgy techniques. For instance, I may combine aluminum oxide in minor amounts with metals to give improved wear resistance or increased fragmentation ability. Or I may consolidate aluminum oxide together with small amounts of added cobalt metal and carbon to obtain a dense, light, wear resistant product with high strength and shock resistance. Or I may consolidate mixtures of metals or ceramics with fibers of metals, ceramics, graphite, or carbides to obtain high density composite materials which will have increased strength and shock resistance.

Instead of using powdered material to be compacted, I may use the material in pressed or sintered form, as is produced by conventional powder metallurgy techniques. The powdered material is pre-pressed or pressed and sintered to give a billet of the desired shape and dimensions to fit, for example, into the container 4 or 18. The metallic container 2 or 26 need not then be employed in this case. The process of my invention increases the density of the pressed or sintered shape to be more nearly the theoretical density of the material. As compared with using packed powders, the use of preforms resulting from pressure or sintering requires a lesser volume reduction to attain like maximum densities as compared with using packed powders and can allow a greater weight of material to be compacted in a given die, and permits closer tolerances in dimensions of formed solid parts. A pressed or sintered part or parts also may be packed in particulate material within a container as in the process of FIG. 7 without an internal container separating the part from the particulate material.

For some metals which may appear in sponge form, for example, titanium sponge, I form the sponge to fit the container. If it is desired, the sponge may be first precompressed by conventional techniques to form a preform of the desired shape and size to fit into the container to be processed according to my invention. The bulk density of the sponge is increased materially and by the compaction in the process of FIGS. 1-9, approaches the theoretical density of the metal.

It also is possible in the process of my invention to employ alloying elements which are themselves liquid or even volatile at consolidation temperatures. Alloys containing such volatile elements normally are difficult to make by ordinary powder metallurgy procedures or by melting and casting practices. However, in the procedures of my invention, alloying elements may be used which have boiling points below the melting points of the alloy's base metals. The materials are intimately mixed in powder form under non-reactive conditions to form a uniform mix. This may be accomplished at room temperature and materials heated at an elevated temperature in a closed container suitably sealed.

For such use, I prefer to employ the metallic containers of FIG. 1 or FIG. 7. The metallic containers may be sealed tight by welding or other conventional sealing means. The escape of metallic vapor will be sufficiently inhibited by such sealing technique. The vaporized metal diffuses through the mass of powder in the container to form a relatively uniform composition under conditions of my process.

Where oxidizable powders are used, the container may be filled in the presence of a non-oxidizing gas and sealed under vacuum. Such filling and sealing procedures are well known for filling cans with powder and may be employed here.

The process of my invention may also be employed using powder mixtures of which a component or components are liquid at the compaction temperature.

The particle size of the powdered material may be that employed in conventional powder metallurgy, and may vary from less than 1 micron average diameter up to about 30 to 50 mesh or larger.

The temperature to which the material to be consolidated is heated for the purposes of my invention depends on the nature of the material and the nature of the container, and may be from about 25% to about 90% of the melting point of the material. For materials of relatively high melting point, for example, the refractory metals, the preferred temperature is from about 40% to about 70% of the melting point. For the metals of lower melting point, as for example, the softer metals already described, the temperature may be raised to about 25% to 90% of the melting point. Temperatures below about 40% of the melting point are useful where the consolidation is primarily for the purpose of developing structural strength materials with less than full density. For purposes of developing high density materials approaching theoretical density, the consolidation temperatures for the harder refractory metals and materials preferably are about 40% or more, up to about 90% of the melting point. For softer metals, the temperature may be up to about 90% of the melting point to obtain high densification of the material.

The upper limit of temperature for consolidation is determined in part by the melting point of the container material, its structural integrity and strength at the consolidation temperature, and its resistance to damaging interaction with the contained material at high temperatures. The lower limit of temperature is determined in part by the pressure and forming rate employed. The higher the temperature, for any given loading, the denser will be the resultant product up to theoretical density. Where a component is added which it is desired to liquefy or vaporize, the temperature should be sufficient for this purpose, but insufficient to liquefy the remaining powdered material.

In the preferred embodiment of my invention where pressing operations such as shown in FIGS. 1-9 are employed, I apply the pressure at a controlled rate, causing the press plunger to descend at a controlled rate by a controlled rate of application of pressure to the plunger.

In the preferred operation of my process, I maintain the terminal pressure at a substantially constant value for a prolonged period of time.

The normal terminal pressure ranges from about 10 to about 40 tons per square inch, depending on the rigidity of the contained powdered material at the compaction temperature. The softer, i.e. the more ductile powdered material will require a lower forming temperature and terminal pressure than the more rigid materials such as the refractory metals and materials. In some instances, it may be desirable to use pressures up to 250 tons per square inch or higher to achieve desired densification or other results with the harder refractory materials.

The rate of pressure application normally corresponds to a plunger descent of about ½ to about 40 inches per second, higher rates being employed for the softer ductile materials, and the lower rates for the less ductile, more rigid materials, such as those listed above. The rates of descent which may be employed, are the higher the higher the temperatures.

The duration of the hold period after attainment of the terminal pressure, may be usually from about 1 to 60 seconds, the lower period being for the more ductile, softer materials, the longer period for the less ductile, more rigid materials. The period normally being the less the higher the temperature.

While higher forming rates up to impact forming, and shorter holding periods, as for example, that produced by hammer impact or toggle or crank presses, will provide compaction if the loading and temperature are sufficiently high, the rates of forming and hold time stated above, are preferred especially where harder materials such as the refractory materials are processed.

In some cases, for example, in the case of softer metals, where the container is more rigid than the contained material, the pressure required will be determined primarily by that necessary to cause the compression of the container. In the case of the more rigid contained material, a pressure sufficient to compress the rigid material, e.g. refractory metal, will usually be sufficient to compress the container.

In the process of my invention, the compacted product is a coherent solid article which has a density depending on the factors as stated above.

The metallic container referred to above, may be a sheet metal container or a machined container. The wall thickness of the container should be sufficient to permit ready handling i.e. the container should have dimensional stability until it is upset in the process. The wall thickness will usually be substantially less than the wall thickness of the refractory container. The metal chosen should be preferably of a melting point substantially higher than the temperature to which the container is heated and be sufficiently ductile to be upset in the process. Thus, the metal may be any of the soft metals referred to above when the highest temperature attained in the process is below the melting point of the metal.

The material to be employed in the refractory container of FIGS. 1-6, or in the liner of refractory particulate material 25' of FIG. 7, depends in part upon the temperatures which are to be employed in the heating stage. The container preferably should have the following properties, in the preferred form of my invention.

It should have the strength and rigidity to support the contained material during the heating and the forming process. It should preferably, but not necessarily so in every instance, be inert to the contained material and the forming apparatus. The container, when formed, should, prior to the compaction, be of such character that it contains voids between the particles forming the container and have the stability as described above. Preferably, it should be of such character as to be deformable in a manner to transmit the forming compressive forces to the contained material.

The container has other important functions in the consolidation process. When the container is made to have connected, open pores, as in a castable aluminum oxide container, the pores allow venting of the gases from the charge as the charge is consolidated to higher densities. The gases escape through the container walls and are exhausted through the space between the punches and the die wall. This function is less important when a charge has been prepressed to about 90% of theoretical density or when a charge has been sealed in an evacuated metal container within the refractory or ceramic material container.

Whether the porosity in the container material is continuous or closed, the collapse of the pores during the initial period of consolidation provides flow characteristics that are compatible with the initial deformation of the pores in the contained charge. This characteristic of the container material, together with its ability to deform plastically in the process, provides controlled compaction of the contained charge to a predictable form, and a relatively uniform distribution of pressure on all the charge surfaces.

The top and bottom of the container act as insulating caps to prevent heat loss from the charge to the punches, and as porous venting caps to allow venting of gases from the charge to the outer atmosphere through the space between the punches and the die walls. The caps also provide material with high resistance to surface flow at all punch and die gaps that prevents extrusion of the container or charge into the gaps, and keeps the punches from binding in the die.

The ceramic or refractory container materials that are employed in the process of this invention are capable of being cast, pressed, sprayed, or otherwise molded to complex internal configurations and uniform external shapes with close control over all dimensions. The final formed container provides firm support for the product form during the heating prior to consolidation. The container's dimensional stability and strength during heating assures a smooth flow of containers and charges through the entire consolidation process.

In most cases, the refractory or ceramic materials used for containers will not compact to full density during consolidation. In addition, they are materials that normally will have a high level of friability relative to the consolidated charge. These characteristics make it possible to remove the container material readily and at low cost from the consolidated charge, either by machining, by impact, by thermal shock, by gritblasting, or similar techniques.

The chemical stability and chemical inertness of the ceramic or refractory materials used for containers are important features in preventing contamination of the charge during heating and consolidation. These qualities, together with the ability of the container materials to be crushed and ground, also make it possible to economically reclaim the container materials for re-use after consolidation by crushing, grinding, washing, and firing.

When powdered ceramic or refractory material is packed around the charge in a container, the powdered material has all of the container material functions described above, except that it is not self-supporting without a container.

The refractory materials, which are to be distinguished from refractory metals, may include graphite, carbon, and the ceramic materials. Such ceramic materials suitable for forming bodies which have dimensional stability at various temperatures are well known to the art. Ceramics suitable for high temperatures are referred to in the ceramic art as refractory ceramics. Graphite or carbon, while not ceramics, may be included as refractory materials, since they have dimensional stability and other properties at high temperatures which compare favorably with refractory ceramics.

Refractory materials useable to make the insulative container may be characterized as comprising any of or mixtures of carbon, graphite and the ceramics, which term is intended to include those chemically combined metal compounds and compositions which have come to be characterized as ceramics. The latter include such metallic oxides as oxides of any of silicon, aluminum, calcium, magnesium, thorium and zirconium, as well as such oxide complexes, as of combinations of any of silicon, calcium, aluminum or magnesium oxides that exist in earths and clays; also metallic sulfates, e.g. sulfates of barium or calcium; aluminates, e.g. aluminates of calcium or magnesium; silicates, e.g. silicates of aluminum, calcium or zirconium; and such fluorides as calcium fluoride. The foregoing may be used in various combinations as mixtures. They may also be structurally bonded together by the use of appropriate binders such as metallic silicates and aluminates and colloidal oxides.

Techniques for forming containers heretofore referred to, from various refractory materials, may be any of the well known procedures of the ceramic, graphite or analogous arts. Thus, depending on the temperatures to be employed, I select as the useful ceramic material, one whose melting point is well above the temperature to which the container is to be heated in my process, and which will plastically deform during compaction at the forming temperatures.

The porous refractory container, either in the coherent form of FIGS. 1-6 or the particulate form of FIG. 7, or the liner of FIGS. 8 and 9, due to its highly porous nature, is desirably a good heat insulator. During the early stage of the proceedings, i.e., the heating and early stages of compaction, it acts to contain the heat in the powdered material charge. It introduces a heat barrier between the powdered material and the press cavity. As the container material is compacted, its porosity decreases, however, the period in the process when the porosity of the container is severely decreased, and consequently its heat conductivity is increased, is at the terminal end of the compaction process. The heat barrier is thus maintained throughout the period of the process where heat loss is critical.

The conservation of heat which is most critical is in the period between the termination of the heating process and the insertion of the container into the press. At this point, the heat insulating properties of the container and refractory liner are at their highest value and act to suitably insulate the powdered material charge against an unsuitable heat loss.

Cast refractory containers, for example, cast ceramic containers formed in the conventional manner from a suitable ceramic mix for the temperatures to be employed, are dried and, if desired, fired, to produce the containers. These procedures are conventional in the ceramic arts. Such materials have pores, i.e. they are of relatively low bulk density and may, for example, have bulk densities of about 50 to about 90% of the theoretical density of the ceramic material depending on the sintering temperatures and time of sintering.

By applying an axial pressure to the container, confined in a press cavity, the container material is densified, and the theoretical density of the material may be approached. The ceramic container, particularly in the processes illustrated by FIGS. 1–7, maintains substantially the cross-sectional form it had prior to compaction, and is not a crushed heterogeneous mass. The refractory liner of FIGS. 8 and 9 may undergo some fragmentation.

In prior art practice, the interparticle friction and the friction of the powder mass against the die wall, as it is being compressed, cause substantial variation in density between the top and bottom of the formed body. This is particularly aggravated when the process is applied to the refractory metals and materials, which can be highly abrasive in powdered form. By employing the procedures described above, wherein there is a uniform distribution of compressive pressure throughout the powdered material body, these variations in density in the formed body are minimized.

Illustrative of the process of my invention, the following examples are given as further explanation of my invention, and not as a limitation thereof.

*Example 1*

Tungsten powder of about 4 to 5 micron average diameter, formed by the reduction of the oxide, was introduced into a porous container formed of aluminum oxide cemented by a small amount of calcium oxide. The container was 3″ in diameter, with a wall thickness of ¼″. It was 5″ high. The container was covered by a cap having ¼″ thickness. The powder was packed manually by vibrating and impacting the container, to about 55% of the theoretical density of the tungsten powder. The container was heated to a temperature of 2400° F. and immediately introduced into a press according to the processes illustrated by FIG. 3. A terminal pressure of about 60,000 pounds per square inch was attained and the pressure was immediately released by the action of the crank operated plunger. The action thus resembled impact forming. The plunger operated by the crank motion press caused the plunger to descend during compaction of the powder at the average rate of 12 inches per second. The container was compressed, by the procedure schematically illustrated in FIG. 3, from 5 inches to about 3.5 inches in height, with a wall thickness somewhat increased but not materially so. The container was integral and not fragmented. On removal of the container, the resultant solid and coherent tungsten billet had a density of about 75% of the theoretical density.

*Example 2*

Employing the techniques and container and contained tungsten powder of Example 1, but employing a hydraulic press and thus controlling the rate of force application, thereby reducing the speed of the plunger descent during compaction of the powder to an average rate of 1 inch per second for the descent of the plunger, and holding the terminal pressure of substantially 60,000 pounds per square inch over a period of about 5 seconds, the ceramic container was compacted, and the density of the solid and coherent billet produced was 85% of the theoretical density of the metal.

*Example 3*

Employing the same techniques and container and contained tungsten powder as in Example 1, but raising the temperature to 3000° F., the ceramic container was compacted, and a solid and coherent billet having 80% of theoretical density was obtained.

*Example 4*

A molybdenum powder of 5 micron average particle size was processed in the same manner and container as in the previous Example 2, that is, at 2400° F. and with a plunger descent during compaction at the average rate of 1 inch per second and a hold time of about 5 seconds during which the terminal pressure of substantially 60,000 pounds per square inch was maintained. The ceramic container was compacted, and the solid and coherent billet produced was substantially of theoretical density of 10.2 grams per cubic centimeter.

*Example 5*

When the same molybdenum powder was processed by the procedure and container of Example 3, i.e., 3000° F., with the plunger descending during compaction at the average rate of 12 inches per second, the ceramic container was compacted, and the solid and coherent billet had 95% of theoretical density.

The rate of force application which may be employed depends on the magnitude of the applied pressure and the resistance to compaction of the composite body of container and contained material. A reduction in the rate of force application and the maintenance of the terminal pressure can have a greater influence on the densification procedure than does an increase in temperature.

*Example 6*

The container of Example 1 was filled part way with molybdenum powder of Example 5, a ceramic disc of the same composition as the container was placed on top of the powder and the container was filled with a volume of tungsten powder of Example 1, equal in volume to the volume of the molybdenum powder. The process of Example 1 was employed. The ceramic container, with a starting density of 75% of theoretical, had its density increased by a factor of 1.14. The reduction in height of the container was the same as in Example 1 and the wall thickness was increased by an average of ⅛ of an inch. The molybdenum bulk density was originally 55% and was increased by a factor of 1.73. The tungsten bulk density was originally 55% and was increased by a factor of 1.45.

The difference between a high rate of force application and a substantially immediate release of the terminal pressure compared to a slower rate of force application, and a prolonged maintenance of the pressure, at substantially the terminal pressure, is illustrated by the above data, see Examples 1–6. The hold time referred to in the previous portions of the specification, is thus a material aid in addition to the other features of the invention described above, in attaining the desired density and other properties of the consolidated body from the initial powdered state of the material.

In the above and similar procedures, gas released from the material under compression through the container wall may be permitted by the container porosity.

While I have described particular embodiments of my invention for the purpose of illustration, it should be understood that various modifications and adaptations thereof may be made within the spirit of the invention, as set forth in the appended claims.

I claim:

1. A process for consolidating a mass of materials in any of initially powdered, sintered, fibrous, or sponge form and having a bulk density less than the theoretical density of the material and being of the group consisting of metals, metalloids, metal alloys and inorganic metallic compounds, that includes providing a refractory container of a material of the group consisting of carbon, graphite and ceramics composed of chemically combined metals, heating said mass and container to elevated temperatures at which under compression the mass is compactable to coherency and densities approaching its maximum theoretical density and the container is deformable, then placing the heated mass in the container within a rigidly walled compression cavity and compressing the mass and container in the same direction within the cavity and relative to its wall to compact and increase the density of the mass while deforming the container in the direction of and in conformance with the mass compaction, the container and mass being retained within the cavity throughout the compression.

2. The process of claim 1, in which said container is porous.

3. The process of claim 2, in which the container has such porosity as to vent gases from said mass through the container wall during compaction.

4. The process of claim 1, in which said mass is heated in the container and then placed in the compression cavity.

5. The process of claim 1, in which the container is of ceramic metal oxide composition.

6. The process of claim 1, in which said mass is within an inner container inside the refractory container.

7. The process of claim 1, that includes also placement of a removable liner between the container and the cavity wall.

8. The process of claim 7, in which said liner is a longitudinally split metallic liner.

9. The process of claim 1, in which a secondary heat barrier is placed between said container and the cavity wall.

10. The process of claim 1, in which said mass is contained in a metallic container inside said refractory container, and a removable liner is placed between the refractory container and the cavity wall.

11. The process of claim 1, in which compressive force is applied axially of said mass, container and cavity to a terminal pressure between about 10 to 40 tons per square inch while maintaining said mass at a temperature above 25% of its melting point.

12. The process of claim 11, in which the melting temperature of the container is in excess of the consolidation temperature of said mass.

13. The process of claim 12, in which said container is porous.

14. The process of claim 12, in which said mass initially is in powder form.

References Cited

UNITED STATES PATENTS

| | | | |
|---|---|---|---|
| 1,747,133 | 2/1930 | Pirani | 75—200 |
| 2,558,823 | 7/1951 | Crowley | 75—214 |
| 2,691,801 | 10/1954 | Robb | 264—219 |
| 2,858,596 | 11/1958 | Bone | 264—112 |
| 2,941,241 | 6/1960 | Strong | 264—332 |
| 3,089,189 | 5/1963 | Feldman | 264—313 |
| 3,158,547 | 11/1964 | Smith | 264—.5 |
| 3,160,502 | 12/1964 | Quartullo | 75—200 |

L. DEWAYNE RUTLEDGE, *Primary Examiner.*

BENJAMIN R. PADGETT, *Examiner.*

A. J. STEINER, *Assistant Examiner.*